United States Patent
Herrmann

(10) Patent No.: US 6,993,996 B2
(45) Date of Patent: Feb. 7, 2006

(54) TORSIONAL VIBRATION DAMPER

(75) Inventor: Jens Herrmann, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 30 days.

(21) Appl. No.: 10/479,347

(22) PCT Filed: May 31, 2002

(86) PCT No.: PCT/EP02/05997

§ 371 (c)(1),
(2), (4) Date: Aug. 24, 2004

(87) PCT Pub. No.: WO02/097297

PCT Pub. Date: Dec. 5, 2002

(65) Prior Publication Data

US 2005/0000767 A1      Jan. 6, 2005

(30) Foreign Application Priority Data

May 31, 2001   (DE) ................................ 101 26 477

(51) Int. Cl.
*F16F 15/173*   (2006.01)

(52) U.S. Cl. .................................. 74/573 F; 74/573 R

(58) Field of Classification Search .............. 74/573 R, 74/573 F; 29/423, 564; 428/593–598
See application file for complete search history.

(56) References Cited

U.S. PATENT DOCUMENTS

| | | | | |
|---|---|---|---|---|
| 4,723,675 A | * | 2/1988 | Haderer et al. | ............. 215/253 |
| 5,253,877 A | * | 10/1993 | DeBiasse et al. | ........... 277/437 |
| 5,654,106 A | * | 8/1997 | Purnell et al. | ............. 428/547 |

FOREIGN PATENT DOCUMENTS

DE            0745784       * 12/1996

* cited by examiner

*Primary Examiner*—Chris Schwartz
(74) *Attorney, Agent, or Firm*—Crowell & Moring LLP

(57) ABSTRACT

The invention relates to a hydraulic torsional vibration damper which is characterized in that the secondary mass is guided by a pair of slotted plastic flange sleeves with an L-shaped cross-section. The damper is characterized in that the butt joint is closed by a bridge temporarily formed onto it that will either break or deform in an elastic plastic manner when thermal length changes occur, thereby allowing transport of the sleeves in a pile and an automatic assembly of the damper.

12 Claims, 6 Drawing Sheets

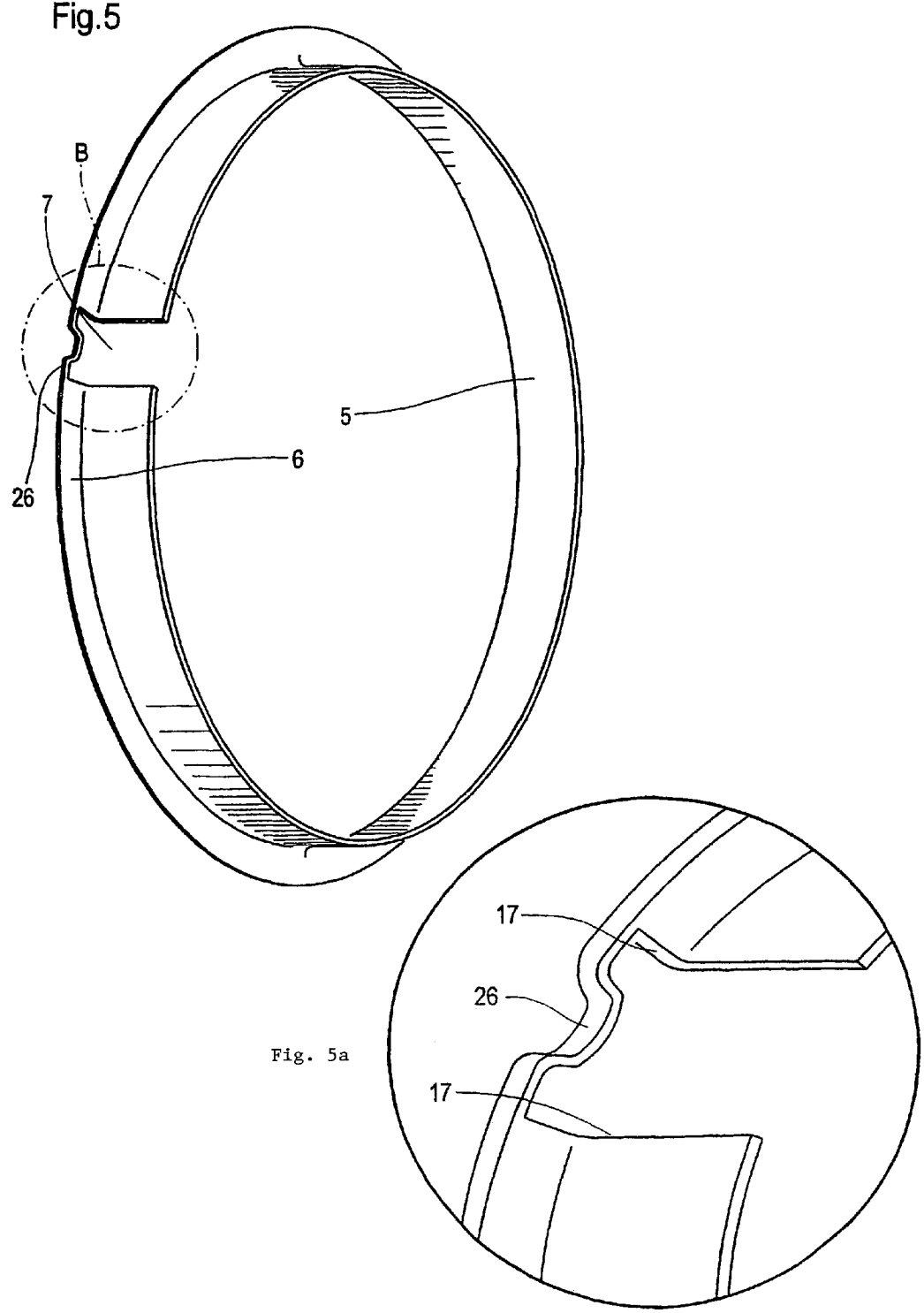

TORSIONAL VIBRATION DAMPER

BACKGROUND AND SUMMARY OF THE INVENTION

The invention relates to a torsional vibration damper with flange sleeves for guiding a rotating ring in a damper housing, the flange sleeves guiding the rotating ring with respect to the damper housing and being inserted loosely, that is, without prestress, between the housing and the ring, and simultaneously maintaining defined shearing gaps between the housing and the ring.

The shearing gap damper, traditionally called a visco or torsional vibration damper, is usually flanged at an output side of diesel engine crankshafts with respect to the power and reduces their torsional vibration amplitudes. As a result of an oscillating shearing of the silicone oil damping medium in the interior of the damper, the oscillation energy is converted to heat which, as a result of convection, is conveyed to the ambient air or to another cooling medium.

Shearing gap dampers normally consist of a ring-shaped housing (1 in FIG. 1) which encloses a secondary mass 2 called a "rotating ring". The housing is connected with the crankshaft M in a torsion-proof manner.

The damper housing and the rotating ring follow the mean rotational speed of the crankshaft without any slip. In contrast, their torsional vibrations, which are superimposed on the uniform rotation, are first communicated only to the housing. The rotating ring would rotate in a uniform manner if it were not coupled to the housing by the damping medium which fills the narrow shearing gap 3. This coupling is elastic and subject to damping. As a result, relative angles of rotation of an angular degree of up to $\pm 1°$ in time with the exciting oscillations occur between the housing and the rotating ring.

Since the rotating ring can therefore rotate in an oscillating manner with respect to the housing, it requires guiding elements.

From European Patent Document EP-PS 0 745 784 B1, a rotating ring bearing in the manner of a "flange sleeve" is known which is made of plastic and has an L-shaped cross-section. A pair of such flange sleeves are part of the equipment of a shearing gap damper. These flange sleeves are inserted without prestress, that is, loosely between the housing and the ring, so that, during relative movements, both metal parts slide on the flange sleeve with the smallest possible coefficient of friction.

The flange sleeves according to European Patent Document EP-PS 0 745 784 B1 provide the best conditions for an uncomplicated fully automatic assembly of shearing gap dampers. However, it was found that the flange sleeves did not yet meet all requirements of an economical manufacturing.

In particular, the closed angle rings according to European Patent Document EP-PS 0 745 784 B1 are not optimal with respect to the excessively different linear coefficients of thermal expansion of the participating materials:

| Steel | $\alpha = 0.0115$ mm/(m × °C.) |
|---|---|
| cast iron | $\alpha = 0.0105$ mm/(m × °C.) |
| PA 66 | $\alpha = 0.070$ mm/(m × °C.) |
| PTFE | $\alpha = 0.130$ mm/(m × °C.) |

According to the temperature range to be assumed—from an arctic $-50°$ C. through $+20°$ C. during the assembly, to $+100°$ C. in the engine, plastic rings grow with, for example, 160 mm bearing diameter by $\Delta l = 5$ to 9 mm in comparison to the housing and rotating ring. Such an increase in length would not take place without any constraints or compression of the bushing cross-section and cannot be accepted.

The straight or diagonally slotted butt joint of the flange sleeves according to European Patent Document EP-PS 0 745 784 was sufficiently wide for easily compensating the temperature-caused length increase of the plastic material. However, the incompatible instability of the cut-open angle rings was a disadvantage. They interlocked and deformed during transport and resisted the grippers of the assembling devices.

It is an object of the present invention to provide a torsional vibration damper of this type, which has a flange sleeve as a bearing device, in such a manner that it accomplishes the required length compensation and, simultaneously, is sufficiently dimensionally stable in order to be able to be processed by a fully automatic production facility.

The invention achieves this task by providing a viscosity-type torsional vibration damper with flange sleeves for guiding a rotating ring in a damper housing, the flange sleeves guiding the rotating ring with respect to the damper housing and being inserted loosely, that is, without prestress, between the housing and the ring, and simultaneously maintaining defined shearing gaps between the housing and the ring. The flange sleeves are formed of a plastic material, and have a preferably L-shaped cross-section, as well as having a butt joint at one point of the circumference. The butt joint is bridged by at least one or more material webs. Accordingly, the butt joint is bridged by at least one or more material webs which, however, do not extend along the above-mentioned width of the flange sleeve.

In a simple manner, the material webs permit good storage properties and easy transportability of the flange sleeves, and also decisively facilitate assembly because deformation and warpage of the slotted rings is prevented.

Advantageous further developments of the invention are described herein.

Essentially two types of approaches present themselves. The butt gap of the flange sleeve is bridged by webs which
 break at the operating temperature, or
 deform in an elastic-plastic manner at the operating temperature.

The flange sleeves are preferably L-shaped. However, the invention is theoretically also suitable for slotted plane axial or radial bearing rings.

BRIEF DESCRIPTION OF THE DRAWINGS

In the following, the invention will be described in detail with reference to the drawings.

FIGS. 5 and 5*a* are views of a slotted flange sleeve with a meandering web and an enlarged view of same, respectively.

DETAILED DESCRIPTION OF THE DRAWINGS

Figure 1:
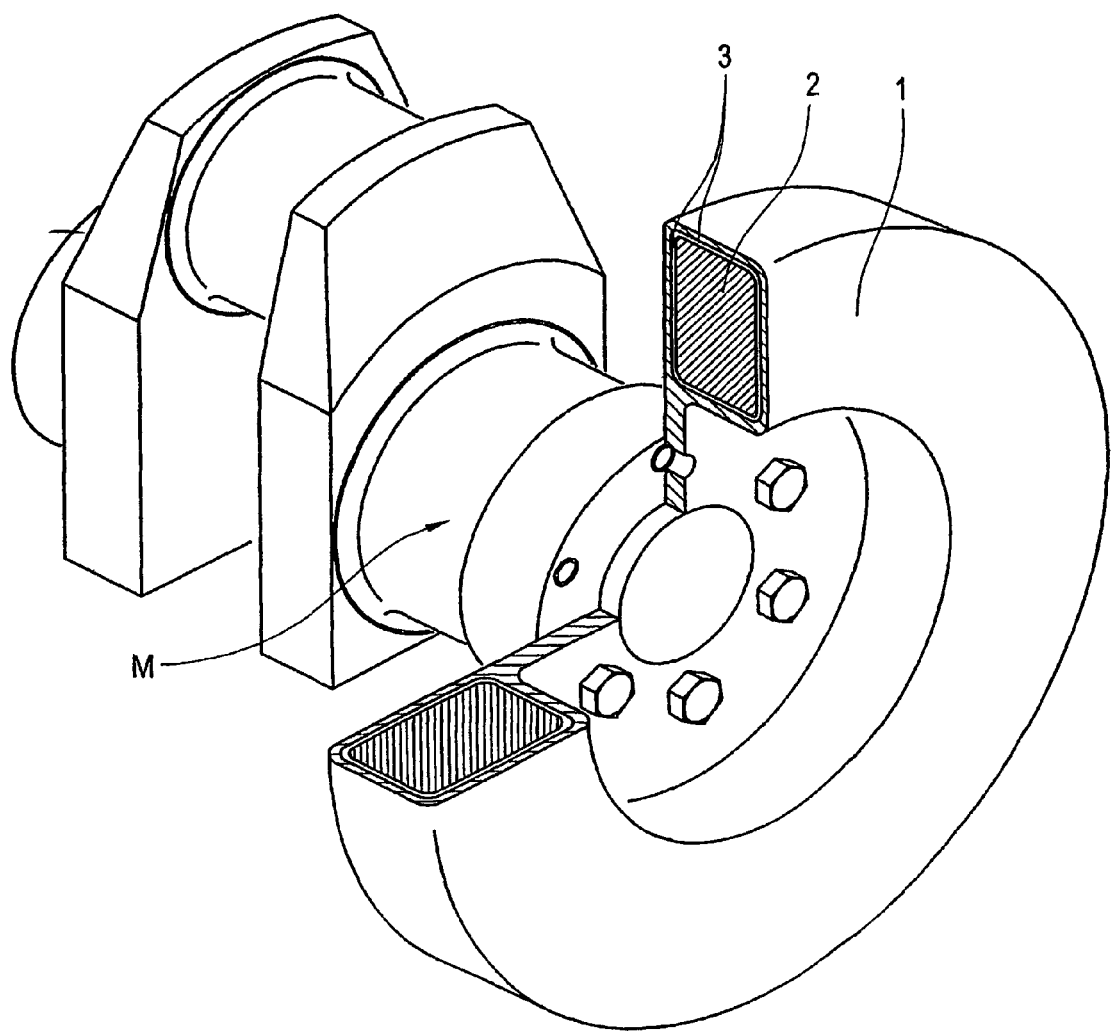
FIG. 1 is a view of a shearing gap damper according to the state of the art.

FIG. 1 illustrates a shearing gap damper with the ring-shaped housing 1, which encloses the rotating ring 2 (secondary mass). The damper housing 1 is connected in a torsion-proof manner with a machine shaft M—of an engine crankshaft—whose torsional vibrations are damped. Between the housing 1 and the rotating ring 2, the shearing gap 3 is situated, which is filled with a damping medium (fluid).

Figure 2:
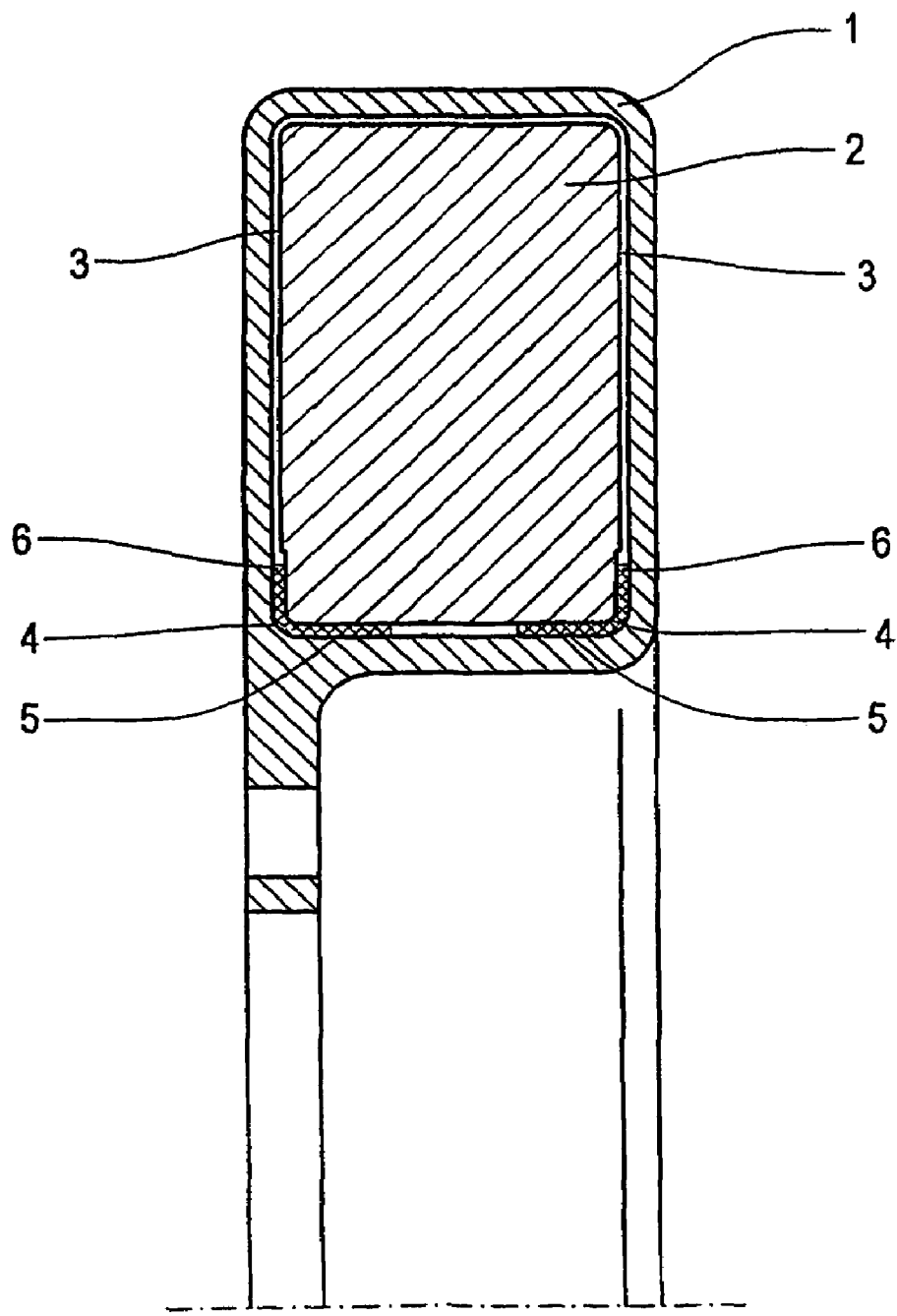
FIG. 2 is a cross-sectional view of the shearing gap damper with a pair of flange sleeves.

According to FIG. 2, the rotating ring 2 is guided by two bearing devices 4—here, flange sleeves 4 with an L-shaped cross-section.

Figure 3:
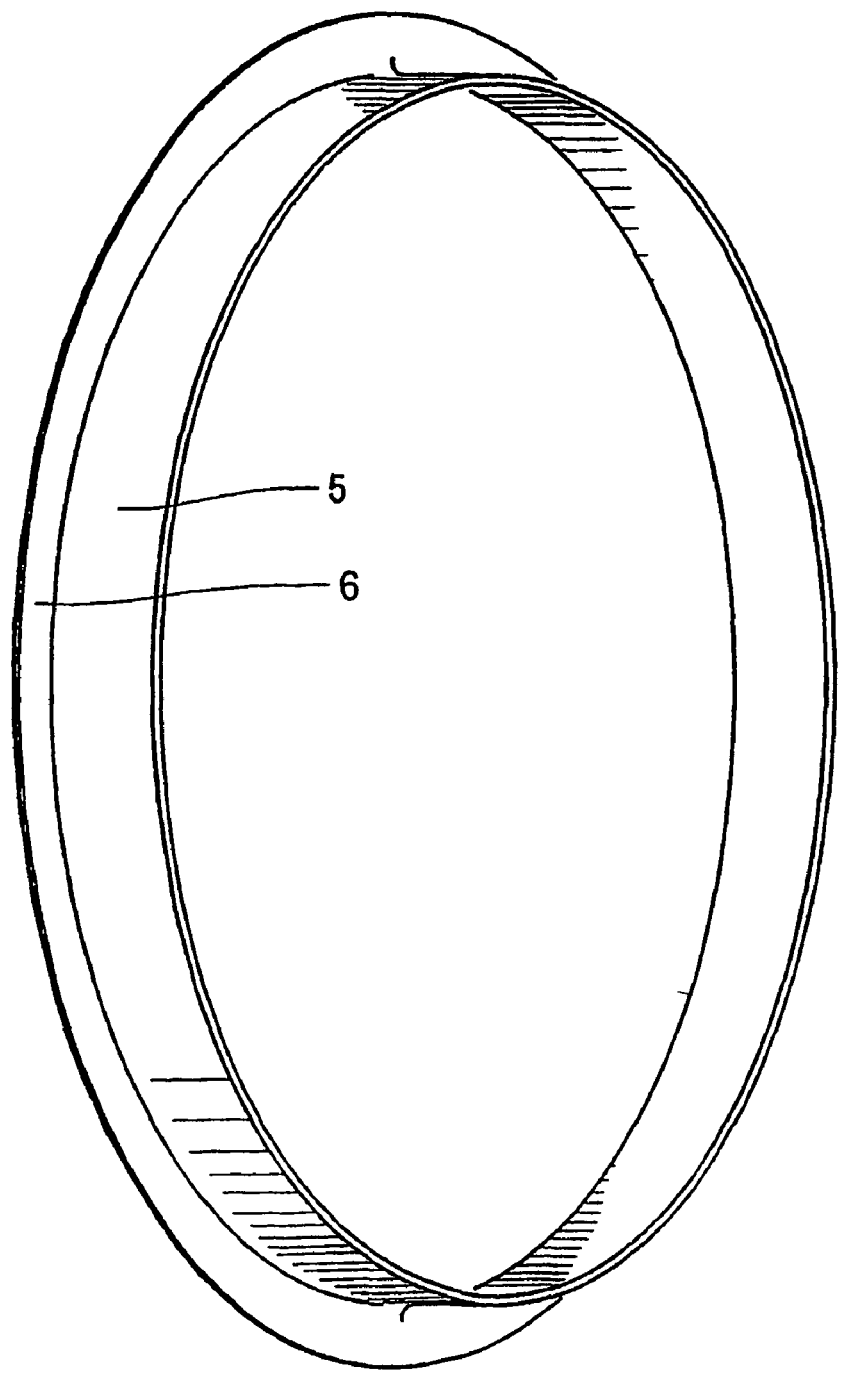
FIG. 3 is an axonometric representation of a closed flange sleeve.

For information purposes, FIG. 3 shows a closed, thus unslotted, flange sleeve. The radial bearing part 5 leads the rotating ring centrically with respect to the axis of rotation, while the axial bearing part 6, together with that of the second flange sleeve in the damper, holds the rotating ring in the axial direction. For reasons of completeness, it should be mentioned that the wall thicknesses of the radial and axial bearing parts, on the one hand, fill the bearing gaps between the housing 1 and the rotating ring 2 and, on the other hand, also maintain the clear width of the shearing gap 3.

Figures 4, 4A:
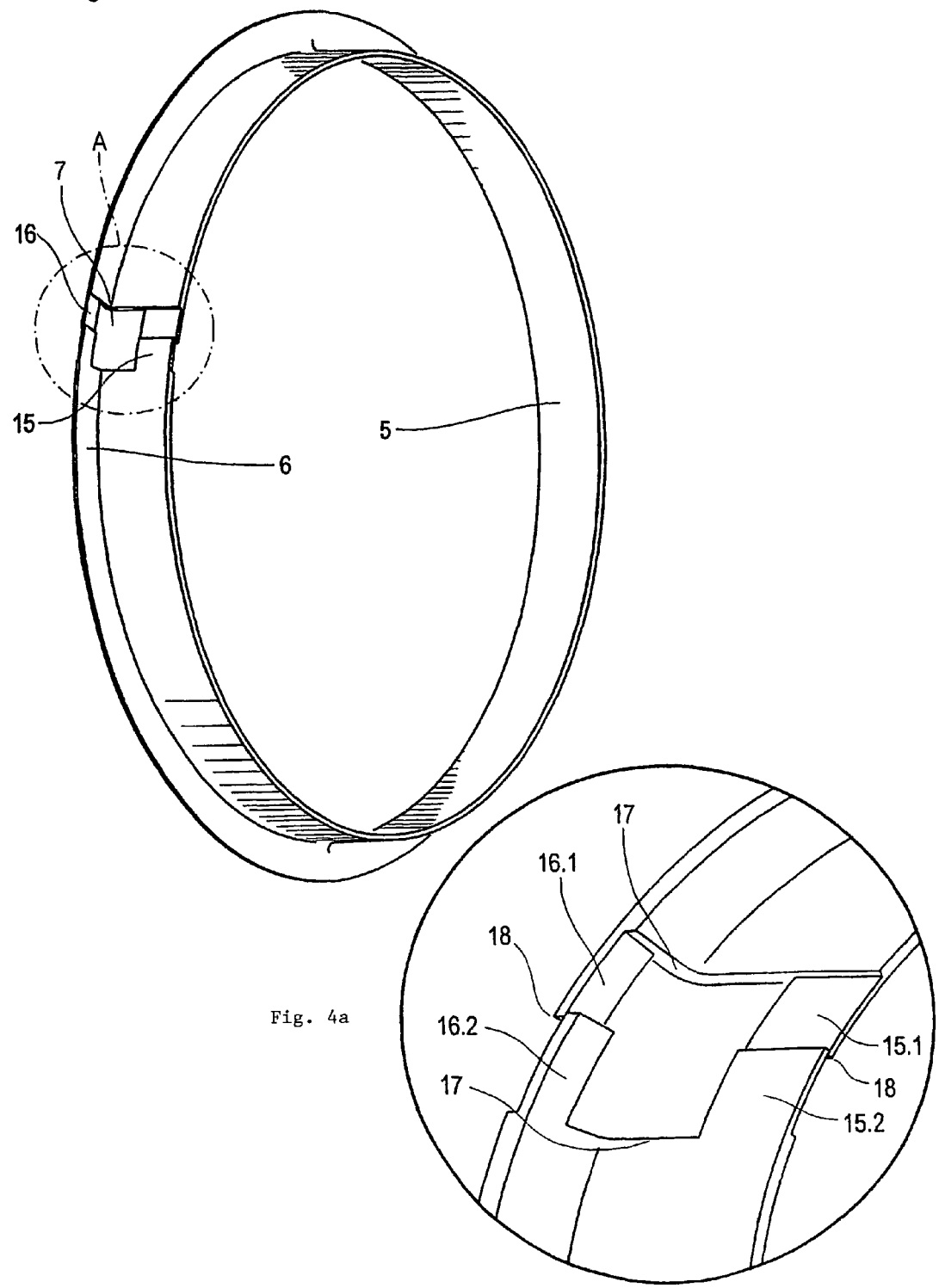
FIGS. 4 and 4*a* are views of a slotted flange sleeve with tear webs and an enlargement of same, respectively.

The flange sleeve of FIG. 4 has a rectangular butt joint 7, which is bridged by the webs 15, 16. The web 15 is aligned with the radial bearing part 5; the web 16 is aligned with the axial bearing part 6. Both webs contain a desired breaking point 18. When, while the damper temperature is rising, the two faces 17 of the butt joint 7 approach one another, the webs tear in the desired breaking points, and the web remnants 15.1 and 15.2 as well as 16.1 and 16.2 slide on one another (FIG. 4a). The added-up wall thicknesses of the web remnants sliding in front of one another corresponds to the wall thickness of the radial bearing part 5 and of the axial bearing part 6, respectively, so that the remaining pieces easily find space in the bearing gap.

Instead of the two described tear webs, only one tear web is also possible, which is arranged either in the radial bearing part or in the axial bearing part.

FIG. 5 shows one butt joint bridge, which deforms in an elastic-plastic manner as the damper temperature rises or falls. A meandering band 26 made of the material of the flange sleeve extends in an alignment with the axial bearing part 6. The wall thickness of the meandering band 26 is equal to or smaller than that of the axial bearing part 6, so that it easily finds sufficient space in the axial bearing gap of the damper. When, as a result of the temperature, the faces 17 of the butt joint approach one another, the meander is pushed together without buckling because it is bordered by the bearing gap. The meander is correspondingly stretched out when the joint edges move away from one another.

As an example, FIGS. 5 and 5a show a meandering web 26 which is situated in the axial bearing part. As an alternative, a web of the same type is also possible for the radial bearing part. As required, meandering webs can be arranged in the radial bearing part as well as in the axial bearing part.

Figure 6:
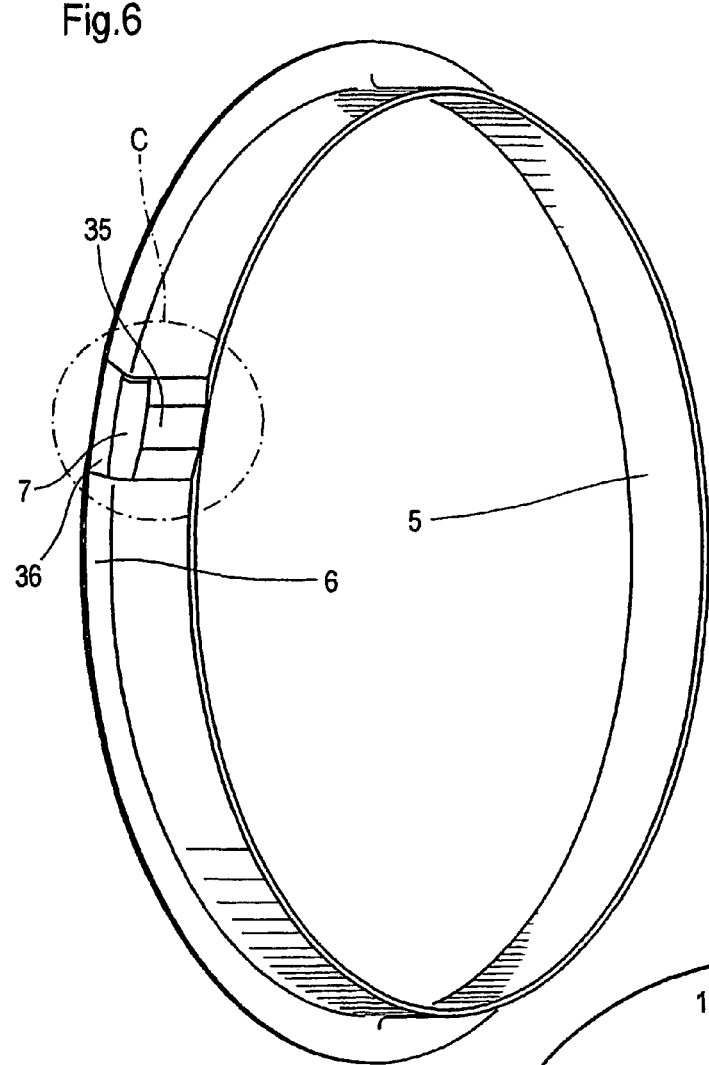
FIGS. 6 and 6*a* are views of a slotted flange sleeve with foil-type webs and an enlarged view of same, respectively.
Figure 6A:
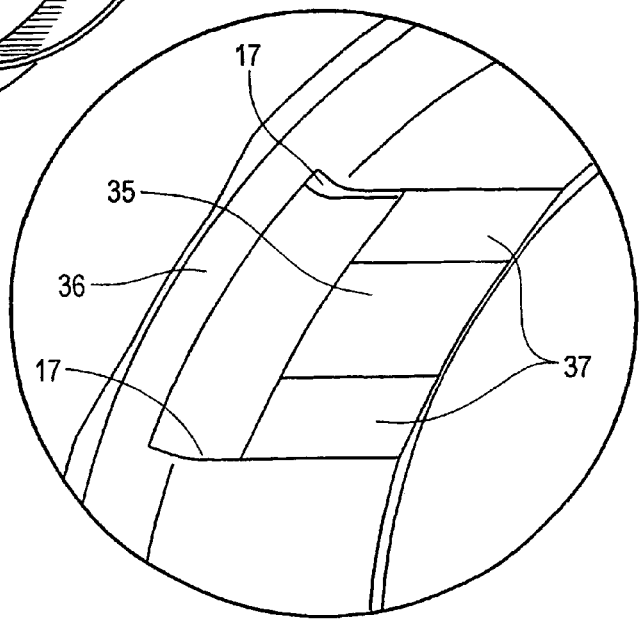

In the case of the flange sleeve of FIG. 6, the radial bearing part 5 and the axial bearing part 6 are narrowed down to a few tenths of a millimeter in the area of the butt joint 7. These weak points are similar to thin-walled foils; they are therefore called foil-type webs 35 and 36 (FIG. 6a). When the faces 17 are approaching because of a thermal change of length, the foil-type webs will buckle. At first, they find space in the radial and axial bearing gap. If the compression continues, the foil parts can come to rest on the adjacent bearing surfaces. The unavoidably occurring wear of bushing material is accepted without any disadvantageous consequences for the damper function.

In order to ensure the described arching of the foil parts and for obtaining a fatigue strength under bending stress for the linkage of the foil-type webs, their clamping points have a ramp-shaped 37 construction.

Should the faces 17 move away from one another at arctically low temperatures, the foil parts would tear without disadvantageous consequences for the rotating ring bearing.

Instead of the two foil-type webs 35, 36 of FIG. 6, a single foil-type web is also possible either in the radial bearing part or in the axial bearing part.

In addition to the described devices for the flexible bridging of the flange sleeve joint 7, other formations can also be arranged, either in an integrated manner made of the material of the flange sleeve or made of a different material. The butt joint to be bridged may have a "straight" construction, thus be parallel to the axis and in a standard position with respect to the axis. Its cutting edges may also extend at arbitrary angles.

The indicated inventive ideas relate not only to the flange sleeves of the inside bearing according to FIG. 2, but also to externally guided rotating rings with slotted flange sleeves.

List of Reference Numbers

1 Damper housing
2 rotating ring
3 shearing gap
4 flange sleeve
5 radial bearing part
6 axial bearing part
7 joint
15 tear web
15.1 web remnant
15.2 web remnant
16 tear web
16.1 web remnant
16.2 web remnant
17 face
18 desired breaking point
26 meandering web
35 foil-type web
36 foil-type web
37 ramp

What is claimed is:

1. A viscosity-type torsional vibration damper, comprising:
   a damper housing;
   a rotating ring;
   flange sleeves for guiding the rotating ring in the damper housing, the flange sleeves being inserted loosely without prestress between the damper housing and the ring, and simultaneously maintaining defined shearing gaps between the housing and the ring, each flange sleeve being made of a plastic material, and having an L-shaped cross-section, and including a butt joint at one circumferential location; and
   wherein the butt joint is bridged by at least one material web, the material web penetrating the butt joint only in sections, and wherein the at least one material web deforms in an elastic-plastic manner during a thermal length increase of the sleeve, and wherein a portion of the web that is connected to the flange sleeve has a ramp-shaped construction with a thickness that decreases with the distance to the flange sleeve to increase fatigue strength.

2. The viscosity-type torsional vibration damper according to claim 1, wherein the at least one material web is constructed as a meandering web and is situated in an alignment with a radial bearing part of the flange sleeve.

3. The viscosity-type torsional vibration damper according to claim 2, wherein the butt joint is bridged by two material webs, which are constructed as meandering webs and which are situated in an alignment with a radial bearing part and an axial bearing part of the flange sleeve, respectively.

4. The viscosity-type torsional vibration damper according to claim 1, wherein the at least one material web is constructed as a meandering web and is situated in an alignment with an axial bearing part of the flange sleeve.

5. The viscosity-type torsional vibration damper according to claim 4, wherein the butt joint is bridged by two material webs, which are constructed as meandering webs and which are situated in an alignment with a radial bearing part and an axial bearing part of the flange sleeve, respectively.

6. The viscosity-type torsional vibration damper according to claim 1, wherein the butt joint is bridged by two material webs, which are constructed as foil-type webs and which are situated in an alignment with a radial bearing part and in an alignment with an axial bearing part of the flange sleeve, respectively.

7. The viscosity-type torsional vibration damper according to claim 1, wherein the at least one material web is constructed as a foil-type web, which is situated either in an alignment with a radial bearing part or in an alignment with an axial bearing part of the flange sleeve.

8. A viscosity-type torsional vibration damper, comprising:
    a damper housing;
    a rotating ring;
    flange sleeves for guiding the rotating ring in the damper housing, the flange sleeves being inserted loosely without prestress between the damper housing and the ring, and simultaneously maintaining defined shearing gaps between the housing and the ring, each flange sleeve being made of a plastic material, and having an L-shaped cross-section, and including a butt joint at one circumferential location; and
    wherein the butt joint is bridged by at least one material web, the material web penetrating the butt joint only in sections, and wherein the butt joint tears during a thermal length increase of the sleeve.

9. The viscosity-type torsional vibration damper according to claim 8, wherein the butt joint is bridged by two material webs, which are constructed as tear webs and which are situated in an alignment with a radial bearing part and in an alignment with an axial bearing part of the flange sleeve.

10. The viscosity-type torsional vibration damper according to claim 8, wherein the at least one material web is situated in an alignment with a radial bearing part or in an alignment with an axial bearing part of the flange sleeve.

11. A viscosity-type torsional vibration damper, comprising:
    a damper housing;
    a rotating ring;
    flange sleeves for guiding the rotating ring in the damper housing, the flange sleeves being inserted loosely without prestress between the damper housing and the ring, and simultaneously maintaining defined shearing gaps between the housing and the ring, each flange sleeve being made of a plastic material, and having an L-shaped cross-section, and including a butt joint at one circumferential location; and
    wherein the butt joint is bridged by at least one material web, the material web penetrating the butt joint only in sections, and wherein the butt joint tears during a thermal length decrease of the sleeve.

12. The viscosity-type torsional vibration damper according to claim 11, wherein the at least one material web is situated in an alignment with a radial bearing part or in an alignment with an axial bearing part of the flange sleeve.

* * * * *